US011286825B2

(12) United States Patent
Korenaga

(10) Patent No.: US 11,286,825 B2
(45) Date of Patent: Mar. 29, 2022

(54) VEHICLE AND CONTROL METHOD FOR VEHICLE

(71) Applicant: TOYOTA JIDOSHA KABUSHIKI KAISHA, Toyota (JP)

(72) Inventor: Shingo Korenaga, Shizuoka (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 337 days.

(21) Appl. No.: 16/538,918

(22) Filed: Aug. 13, 2019

(65) Prior Publication Data

US 2020/0072105 A1 Mar. 5, 2020

(30) Foreign Application Priority Data

Aug. 31, 2018 (JP) .............................. JP2018-163379

(51) Int. Cl.
*F01N 3/20* (2006.01)
*F01N 9/00* (2006.01)

(52) U.S. Cl.
CPC ......... *F01N 3/2006* (2013.01); *F01N 3/2026* (2013.01); *F01N 9/00* (2013.01); *F01N 2900/1628* (2013.01)

(58) Field of Classification Search
CPC .................. F01N 3/2006; F01N 2900/1628
See application file for complete search history.

(56) References Cited

U.S. PATENT DOCUMENTS

| 2011/0265460 A1* | 11/2011 | Hirai ...................... F01N 13/009 60/286 |
| 2012/0260638 A1 | 10/2012 | Yoshioka et al. |
| 2015/0218995 A1 | 8/2015 | Hashimoto |
| 2020/0072108 A1* | 3/2020 | Korenaga ............. B60W 20/16 |
| 2020/0131962 A1* | 4/2020 | Hirooka ................ F01N 3/2013 |

FOREIGN PATENT DOCUMENTS

| DE | 102011017674 A1 | 1/2012 |
| DE | 112012007041 B4 | 11/2017 |
| DE | 102017200353 A1 | 7/2018 |
| JP | H10-089053 A | 4/1998 |
| JP | 2010-202012 A | 9/2010 |
| JP | 2011-231710 A | 11/2011 |
| WO | 2011/114451 A1 | 9/2011 |

* cited by examiner

*Primary Examiner* — Ngoc T Nguyen
(74) *Attorney, Agent, or Firm* — Oliff PLC

(57) ABSTRACT

A vehicle includes an internal combustion engine, an electrically-heated catalyst device provided in an exhaust passage thereof, and an electronic control unit configured to control base material electric power supply supplied to a conductive base material. The catalyst device includes the conductive base material that generates heat upon energization, and a catalyst heated through the conductive base material. The electronic control unit determines whether the conductive base material is in a stagnant period, where temperature of the conductive base material partially stagnates in a prescribed temperature zone, the stagnant period occurring when water is present inside the catalyst device in a process of increase in temperature of the conductive base material. When determining that the conductive base material is in the stagnant period, the electronic control unit controls the base material electric power supply to be lower than when determining otherwise.

5 Claims, 9 Drawing Sheets

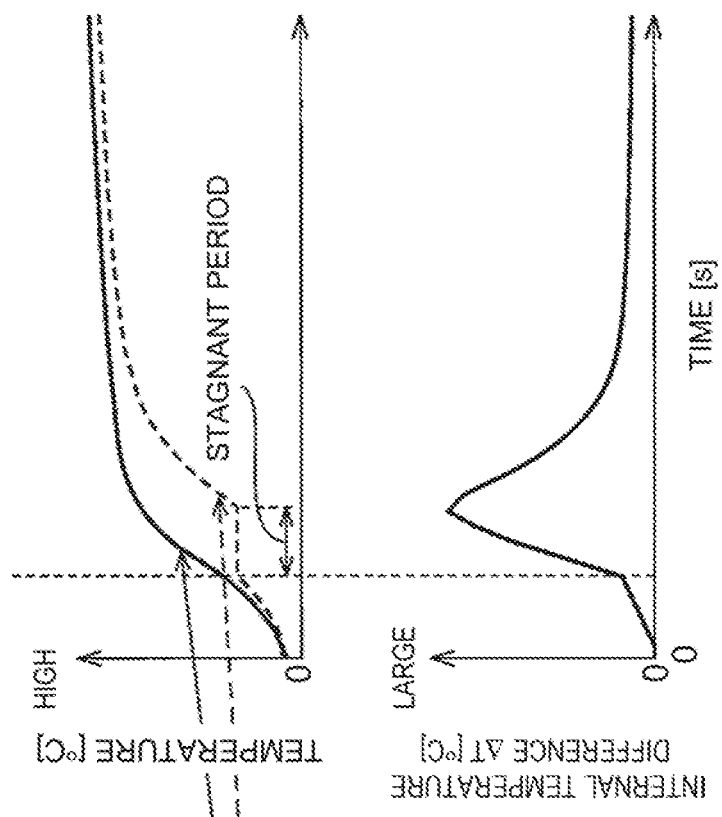
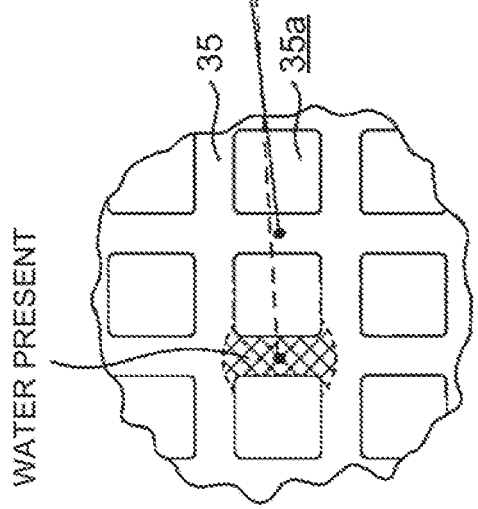

VEHICLE AND CONTROL METHOD FOR VEHICLE

INCORPORATION BY REFERENCE

The disclosure of Japanese Patent Application No. 2018-163379 filed on Aug. 31, 2018 including the specification, drawings and abstract is incorporated herein by reference in its entirety.

BACKGROUND

1. Technical Field

The present disclosure relates to a vehicle, and a control method for a vehicle.

2. Description of Related Art

Disclosed in Japanese Patent Application Publication No. 2011-231710 (JP 2011-231710 A) is a hybrid vehicle including an internal combustion engine and an electric motor as a power source, with an electrically-heated catalyst (EHC) device provided in an exhaust passage of the internal combustion engine. The electrically-heated catalyst device is configured to be able to heat a catalyst carried on a base material, the base material being retained inside the exhaust passage to generate heat upon being energized. When the electrically-heated catalyst device is provided, the catalyst device can be warmed up before the internal combustion engine is started up.

In JP 2011-231710 A, when the base material made of a porous body is heated in the state where water is contained in the base material, bumping may occur inside the base material, so that vapor may be generated. The generated vapor may rapidly increase the pressure inside the base material and cause deterioration of the base material. Accordingly, when water is contained in the base material, low electric power control is performed at the time of heating the base material so as to supply electric power, which is lower than usual, to the base material. The low electric power control is considered to achieve slow and gradual evaporation of the water contained in the base material, and thereby prevent deterioration of the base material due to the bumping.

SUMMARY

When the base material is heated in the state where water is present on the surface or inside of the base material, that is, in the state where water is present inside the catalyst device, there is a possibility of deterioration of the base material attributed to generation of temperature difference inside the base material, in addition to the deterioration of the base material attributed to bumping.

The present disclosure provides a vehicle and a control method for a vehicle that restrain deterioration of a base material which occurs when the base material is heated in the state where water is present inside a catalyst device.

A first aspect of the present disclosure relates to a vehicle. The vehicle includes an internal combustion engine, an electrically-heated catalyst device provided in an exhaust passage of the internal combustion engine, and an electronic control unit. The electrically-heated catalyst device includes a conductive base material that generates heat upon being energized, and a catalyst heated through the conductive base material. The electronic control unit is configured to control base material electric power supply that is supplied to the conductive base material. The electronic control unit is configured to determine whether or not the conductive base material is in a stagnant period where temperature of the conductive base material partially stagnates in a prescribed temperature zone, the stagnant period occurring when water is present inside the electrically-heated catalyst device in a process of increase in temperature of the conductive base material. When determining that the conductive base material is in the stagnant period, the electronic control unit is configured to control the base material electric power supply to be lower than when determining that the conductive base material is not in the stagnant period.

In the vehicle, the electronic control unit may be configured to calculate an internal water content that is a water content present inside the electrically-heated catalyst device. The electronic control unit may be configured to determine that the conductive base material is in the stagnant period, when the internal water content is larger than zero, or equal to or more than a prescribed water content, and the temperature of the conductive base material is equal to or more than a prescribed temperature that allows determination that the water present inside the electrically-heated catalyst device is evaporated.

In the vehicle, when determining that the conductive base material is in the stagnant period, the electronic control unit may be configured to control the base material electric power supply to be lower than when determining that the conductive base material is not in the stagnant period, based on the internal water content. When the internal water content is large, the electronic control unit may be configured to control the base material electric power supply to be lower than when the internal water content is small.

In the vehicle, when determining that the conductive base material is in the stagnant period, the electronic control unit may be configured to control the base material electric power supply, for a prescribed time, to be a prescribed electric power that is lower than a prescribed normal electric power supply that is supplied to the conductive base material when determining that the conductive base material is not in the stagnant period. When the internal water content is large, the electronic control unit may be configured to set the prescribed time longer than when the internal water content is small.

In the vehicle, the prescribed water content may be a water content where a temperature difference, generated between a region where water is present and a region where water is not present in the conductive base material in the process of increase in temperature of the conductive base material when the electronic control unit controls the base material electric power supply to be the prescribed normal electric power supply, becomes equal to or more than a prescribed temperature difference, the prescribed normal electric power supply being supplied to the conductive base material when the electronic control unit determines that the conductive base material is not in the stagnant period.

In the vehicle, the electronic control unit may be configured to determine that the conductive base material is in the stagnant period irrespective of whether or not water is present inside the electrically-heated catalyst device, when the temperature of the conductive base material becomes equal to or more than the prescribed temperature that allows determination that the water present inside of the electrically-heated catalyst device is evaporated. When determining that the conductive base material is in the stagnant period, the electronic control unit may be configured to control the base material electric power supply, for a prescribed time, to be a prescribed electric power that is lower than a prescribed normal electric power supply that is supplied to the conductive base material when determining that the conductive base material is not in the stagnant period.

The vehicle may further include a traveling motor as a driving source of the vehicle. The electronic control unit may be configured to control the base material electric power supply by energizing the conductive base material during traveling of the vehicle with drive power of the traveling motor before starting up the internal combustion engine.

A second aspect of the present disclosure relates to a control method for a vehicle. The vehicle includes an internal combustion engine, an electrically-heated catalyst device provided in an exhaust passage of the internal combustion engine, and an electronic control unit. The electrically-heated catalyst device includes a conductive base material that generates heat upon being energized, and a catalyst heated through the conductive base material. The control method includes: controlling, by the electronic control unit, base material electric power supply that is supplied to the conductive base material; determining, by the electronic control unit, whether or not the conductive base material is in a stagnant period where temperature of the conductive base material partially stagnates in a prescribed temperature zone, the stagnant period occurring when water is present inside the electrically-heated catalyst device in a process of increase in temperature of the conductive base material; and controlling, by the electronic control unit, when the electronic control unit determines that the conductive base material is in the stagnant period, the base material electric power supply to be lower than when determining that the conductive base material is not in the stagnant period.

The above configuration can restrain deterioration of the base material caused when the base material is heated in the state where water is present inside the electrically-heated catalyst device.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein:

FIG. 3A is an explanatory view of a situation in which energization of a conductive base material is started to warm up a catalyst device in the state where water is present on the surface and inside of the conductive base material;

FIG. 3B is an explanatory view of the situation in which energization of the conductive base material is started to warm up the catalyst device in the state where water is present on the surface and inside of the conductive base material;

FIG. 3C is an explanatory view of the situation in which energization of the conductive base material is started to warm up the catalyst device in the state where water is present on the surface and inside of the conductive base material;

DETAILED DESCRIPTION OF EMBODIMENTS

Hereinafter, embodiments of the present disclosure will be described in details with reference to the drawings. In the following description, like component members are designated by like reference numbers.

First Embodiment

Figure 1:
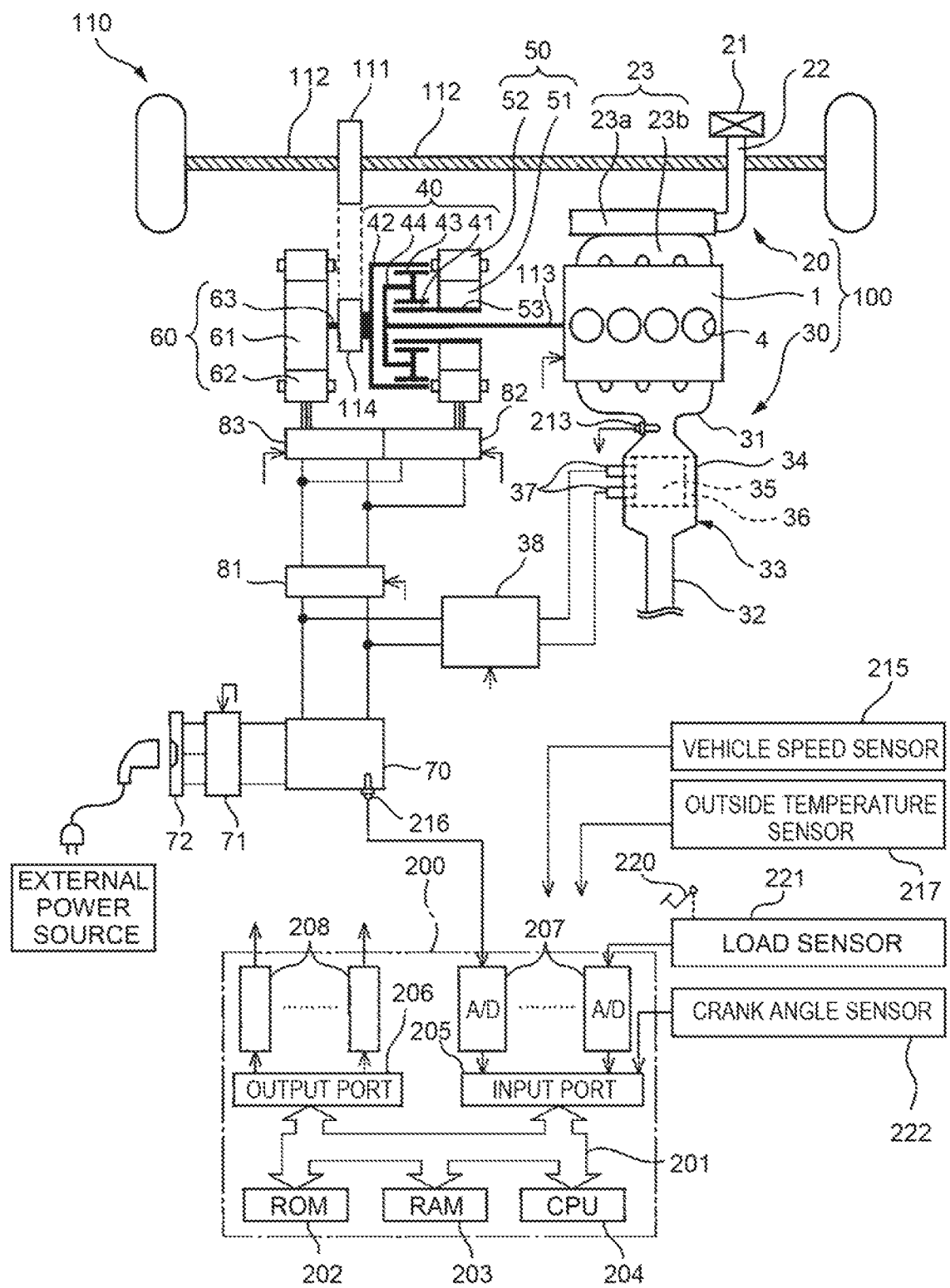
FIG. 1 is a schematic block diagram of a vehicle and an electronic control unit that controls the vehicle according to a first embodiment of the present disclosure.

FIG. 1 is a schematic block diagram of a vehicle 110 and an electronic control unit 200 which controls the vehicle 110 according to a first embodiment of the present disclosure.

In the present embodiment, the vehicle 110 is a hybrid vehicle including an internal combustion engine 100, a power split device 40, a first rotary electric machine 50, a second rotary electric machine 60, a battery 70, a boost converter 81, a first inverter 82, and a second inverter 83. The vehicle 110 is configured such that motive power from one or both of two power sources, the internal combustion engine 100 and the second rotary electric machine 60, can be transmitted to a wheel drive shaft 112 through a final reduction gear 111.

The internal combustion engine 100 includes an engine body 1, an intake device 20, and an exhaust device 30 to generate the motive power for rotating an output shaft 113 that is coupled with a crankshaft (not shown) of the engine body 1. Hereinafter, the detailed configuration of the internal combustion engine 100 will be described also with reference to FIG. 2.

Figure 2:
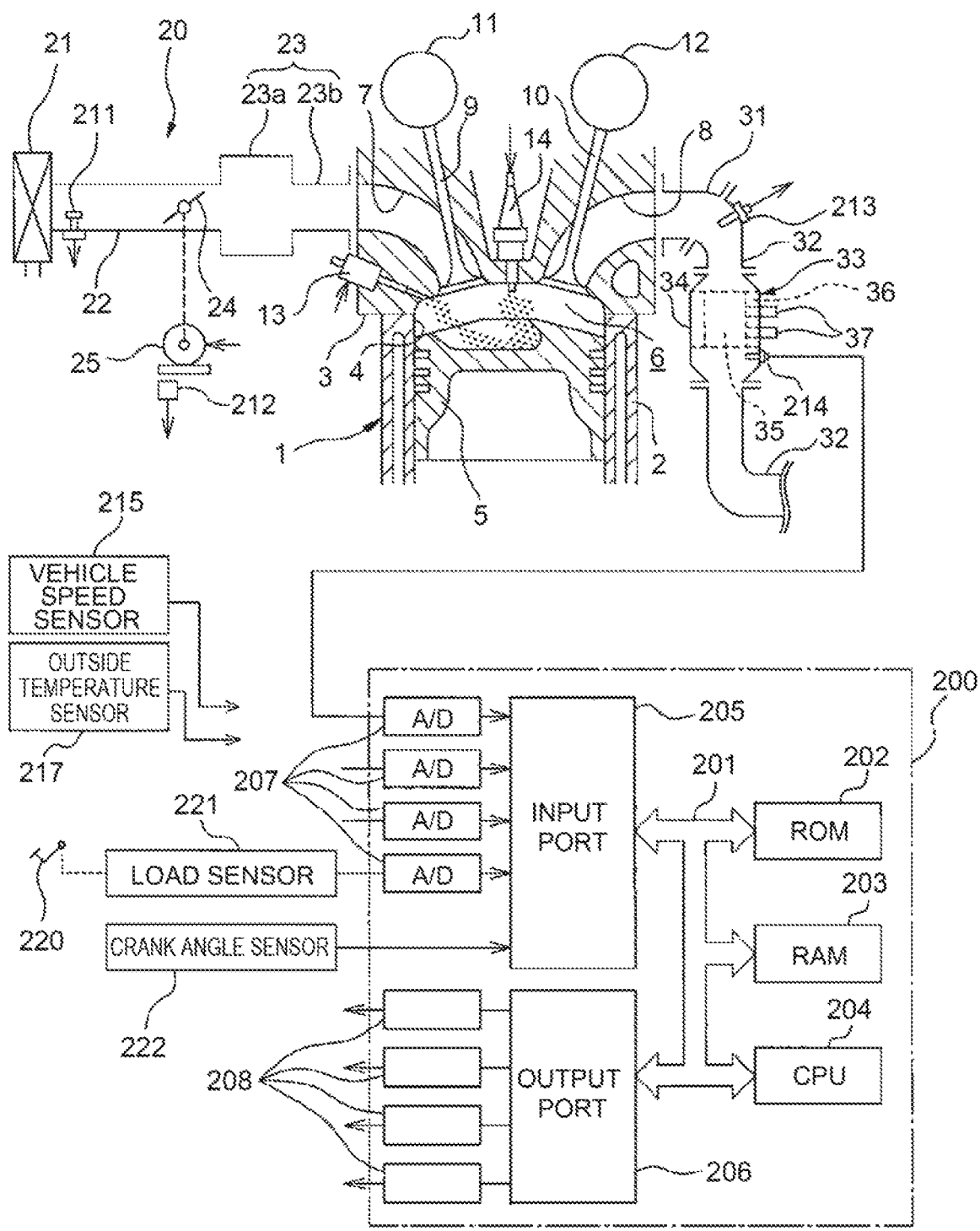
FIG. 2 is an explanatory view of detailed configuration of an internal combustion engine according to the first embodiment of the present disclosure.

As shown in FIG. 2, the engine body 1 includes a cylinder block 2 and a cylinder head 3 fixed to an upper surface of the cylinder block 2.

In the cylinder block 2, a plurality of cylinders 4 is provided. The cylinders 4 each houses a piston 5 which reciprocates inside the corresponding cylinder 4 upon receiving combustion pressure. The piston 5 is coupled with the crankshaft through a connection rod (not shown), and the crankshaft converts reciprocating motions of the piston 5 into rotary motions. A space defined by an inner wall surface of the cylinder head 3, inner wall surfaces of the cylinders 4, and crown surfaces of the pistons 5 serves as the combustion chamber 6.

The cylinder head 3 is provided with intake ports 7 and exhaust ports 8. The intake ports 7 are open to one lateral surface of the cylinder head 3 and to the combustion chamber 6. The exhaust ports 8 are open to the other lateral surface of the cylinder head 3 and to the combustion chamber 6.

The cylinder head 3 is equipped with intake valves 9 for opening and closing the openings between the combustion chamber 6 and the intake ports 7, exhaust valves 10 for opening and closing the openings between the combustion chamber 6 and the exhaust ports 8, intake camshafts 11 which drive the intake valves 9 to be opened and closed, and exhaust cam shafts 12 which drive the exhaust valves 10 to be opened and closed. Each of the intake camshafts 11 has one end provided with a hydraulic variable valve system (not shown) which can set opening and closing time of the intake valves 9 to optional time.

The cylinder head 3 is further equipped with fuel injection valves 13 for injecting fuel into the combustion chamber 6, and ignition plugs 14 for igniting air-fuel mixture made of fuel and air which are injected from the fuel injection valves 13. The fuel injection valves 13 may be installed so as to inject fuel into the intake ports 7.

The intake device 20, which is a device for guiding air into the cylinders 4 through the intake ports 7, includes an air cleaner 21, an intake pipe 22, an intake manifold 23, an air flowmeter 211, and an electronically controlled throttle valve 24.

The air cleaner 21 removes foreign materials, such as sand included in the air.

The intake pipe 22 has one end coupled with the air cleaner 21, and the other end coupled with a surge tank 23a of the intake manifold 23. The intake pipe 22 guides the air (intake air), which flows into the intake pipe 22 through the air cleaner 21, to the surge tank 23a of the intake manifold 23.

The intake manifold 23 includes the surge tank 23a, and a plurality of intake air branch pipes 23b which is branched from the surge tank 23a, the intake air branch pipes 23b being coupled with the openings of the intake ports 7, formed on the lateral surface of the cylinder head, respectively. The air guided by the surge tank 23a is uniformly distributed into the respective cylinders 4 through the intake air branch pipes 23b. Thus, the intake pipe 22, the intake manifold 23, and the intake ports 7 form intake passages for guiding air into the cylinders 4.

The air flowmeter 211 is provided inside the intake pipe 22. The air flowmeter 211 detects a flow rate of air (hereinafter referred to as "intake air amount") flowing through the intake pipe 22.

The throttle valve 24 is provided in the intake pipe 22 on the downstream side of the air flowmeter 211. The throttle valve 24 is driven by a throttle actuator 25 to change a passage sectional area of the intake pipe 22 continuously or in stages. The intake air amount in each of the cylinders 4 is regulated, when the throttle actuator 25 regulates the opening degree (hereinafter referred to as "throttle opening") of the throttle valve 24. The throttle opening is detected by a throttle sensor 212.

The exhaust device 30 is a device for cleaning up the combustion gas (hereinafter referred to as "exhaust gas") generated in the combustion chamber 6 and discharging the exhaust gas to the outside of the vehicle. The exhaust device 30 includes an exhaust manifold 31, an exhaust pipe 32, an exhaust temperature sensor 213, and an electrically-heated catalyst device 33.

The exhaust manifold 31 includes a plurality of exhaust branch pipes 31a coupled with the openings of the respective exhaust ports 8, which are formed on the lateral surface of the cylinder head, and a collecting pipe 31b formed by collecting the exhaust branch pipes 31a to one.

The exhaust pipe 32 has one end coupled with the collecting pipe 31b of the exhaust manifold 31, and the other end open to the outside of the vehicle. The exhaust gas, discharged from each of the cylinders 4 to the exhaust manifold 31 through the exhaust ports 8, flows through the exhaust pipe 32 and is discharged to the outside of the vehicle.

The exhaust temperature sensor 213, which is provided in a portion of the exhaust pipe 32 on the upstream side of the catalyst device 33, detects the temperature of the exhaust gas flowing into the catalyst device 33.

The electrically-heated catalyst device 33 includes an outer casing 34 attached to the exhaust pipe 32, a conductive base material 35, a holding mat 36, and a pair of electrodes 37.

The outer casing 34, which is a component for housing the conductive base material 35, is typically a casing made of metal such as stainless steel, or nonmetal such as ceramics.

The conductive base material 35 is formed with a material that generates heat upon being energized, such as silicon carbide (SiC) or molybdenum disilicide ($MoSi_2$). The conductive base material 35 in the present embodiment is what is called a honeycomb carrier including a plurality of exhaust gas circulation passages 35a (see FIG. 3A) formed along the flow direction of exhaust gas. A catalyst is carried on the surface of the exhaust gas circulation passages 35a. Although the conductive base material 35 carries a three-way catalyst in the present embodiment, the type of the catalyst carried on the conductive base material 35 is not particularly limited. Any catalyst that is necessary to obtain desired exhaust gas control performance can appropriately be selected from various catalysts and be carried on the conductive base material 35.

The holding mat 36 is a component provided between the outer casing 34 and the conductive base material 35 so as to fill the gap between the outer casing 34 and the conductive base material 35 in order to hold the conductive base material 35 at a prescribed position in the outer casing 34. The holding mat 36 is formed, for example, with an electrically insulating material, such as alumina ($Al_2O_3$).

The pair of electrodes 37, which are components for applying voltage to the conductive base material 35, are each electrically connected to the conductive base material 35 in the state electrically insulated from the outer casing 34, and are also connected to the battery 70 through a voltage regulation circuit 38 for regulating the voltage applied to the conductive base material 35 as shown in FIG. 1. When a voltage is applied to the conductive base material 35 through the electrodes 37 to supply electric power to the conductive base material 35, a current flows into the conductive base material 35, which causes heat generation in the conductive base material 35. As a result, the catalyst carried on the conductive base material 35 is heated. The voltage applied to the conductive base material 35 by the electrodes 37 can be regulated when the electronic control unit 200 controls the voltage regulation circuit 38. For example, the voltage of the battery 70 can be applied without any regulation, or the voltage of the battery 70 regulated to an optional voltage can be applied. Thus, in the present embodiment, since the electronic control unit 200 controls the voltage regulation circuit 38, the electric power supplied to the conductive base material 35 (hereinafter referred to as "base material electric power supply") can be controlled to optional electric power.

The exhaust ports 8, the exhaust manifold 31, the exhaust pipe 32, and the outer casing 34 form an exhaust passage that carries the exhaust gas discharged from each of the cylinders 4.

Although the natural aspiration gasoline engine is illustrated as an example of the internal combustion engine 100 in the present embodiment, the internal combustion engine 100 is not limited to the configuration disclosed. The internal combustion engine 100 may be different from the above-configured natural aspiration gasoline engine in such aspects as combustion, cylinder arrangement, fuel injection, the configuration of an intake and exhaust system, the configuration of the valve gear, the presence of a supercharger, and supercharging.

Referring again to FIG. 1, the power split device 40 is a planetary gear for dividing the motive power of the internal combustion engine 100 into two systems, motive power for rotating the wheel drive shaft 112, and motive power for regeneratively driving the first rotary electric machine 50. The power split device 40 includes a sun gear 41, a ring gear 42, pinion gears 43, and a planetary carrier 44.

The sun gear 41 is an external gear disposed in the center of the power split device 40. The sun gear 41 is coupled with a rotary shaft 53 of the first rotary electric machine 50.

The ring gear 42 is an internal gear disposed around the sun gear 41 so as to be concentric with the sun gear 41. The ring gear 42 is coupled with a rotary shaft 63 of the second rotary electric machine 60. The ring gear 42 has an integrally attached drive gear 114 for transmitting rotation of the ring gear 42 to the wheel drive shaft 112 through the final reduction gear 111.

The pinion gears 43 are external gears disposed between the sun gear 41 and the ring gear 42 so as to gear with the sun gear 41 and the ring gear 42.

The planetary carrier 44 is coupled with the output shaft 113 of the internal combustion engine 100, and rotates around the output shaft 113. The planetary carrier 44 is also coupled with each of the pinion gears 43 such that when the planetary carrier 44 rotates, each of the pinion gears 43 can individually rotate (on its own axis) while rotating (revolving) around the sun gear 41.

The first rotary electric machine 50 is, for example, a three-phase alternating current synchronous motor-generator, including a rotor 51 and a stator 52. The rotor 51 is attached to the circumference of the rotary shaft 53 that is coupled with the sun gear 41, the rotor 51 having a plurality of permanent magnets embedded in an outer periphery. The stator 52 is wound with an exciting coil that generates a rotating magnetic field. The first rotary electric machine 50 includes a function as an electric motor which performs powering driving upon reception of the electric power supply from the battery 70, and a function as an electric generator regeneratively driven upon reception of the motive power of the internal combustion engine 100.

In the present embodiment, the first rotary electric machine 50 is mainly used as an electric generator. When the output shaft 113 is rotated to perform cranking at the time of a startup of the internal combustion engine 100, the first rotary electric machine 50 is used as an electric motor and plays the role of a starter.

The second rotary electric machine 60 is, for example, a three-phase alternating current synchronous motor-generator, including a rotor 61 and a stator 62. The rotor 61 is attached to the circumference of the rotary shaft 53 that is coupled with the ring gear 42, the rotor 61 having a plurality of permanent magnets embedded in an outer periphery. The stator 62 is wound with an exciting coil that generates a rotating magnetic field. The second rotary electric machine 60 includes a function as an electric motor which performs powering driving upon reception of the electric power supply from the battery 70, and a function as an electric generator regeneratively driven upon reception of the motive power from the wheel drive shaft 112 at the time of deceleration of the vehicle 110, or the like.

The battery 70 is a chargeable and dischargeable secondary battery, such as a nickel cadmium storage battery, a nickel hydrogen storage battery, or a lithium ion battery, for example. In the present embodiment, the lithium-ion secondary battery having a rated voltage of about 200 [V] is used as the battery 70. The battery 70 is electrically connected to the first rotary electric machine 50 and the second rotary electric machine 60 through a boost converter 81 or the like, such that the charging electric power of the battery 70 can be supplied to the first rotary electric machine 50 and the second rotary electric machine 60 for powering driving, and that the battery 70 can be charged with the electric power generated by the first rotary electric machine 50 and the second rotary electric machine 60. The battery 70 is also electrically connected to the conductive base material 35 through the voltage regulation circuit 38 and the electrodes 37, such that the charging electric power of the battery 70 can be supplied to the conductive base material 35 for heating of the conductive base material 35.

The battery 70 is further configured to be electrically connectable with an external power source through a charging control circuit 71 and a charging lid 72, such that the battery 70 can be charged from the external power source, such as a household convenience outlet. The charging control circuit 71 is an electrical circuit that can convert alternating current supplied from the external power source into direct current, boost an input voltage to a battery voltage, and charge the battery 70 with the electric power of the external power source, based on a control signal from the electronic control unit 200. The battery 70 does not necessarily need to be configured to be chargeable from the external power source.

The boost converter 81 includes an electrical circuit which can boost an inter-terminal voltage of a primary-side terminal, and output the boosted voltage from a secondary-side terminal, based on the control signal from the electronic control unit 200, and which can conversely step down an inter-terminal voltage of the secondary-side terminal and output the stepped-down voltage from the primary-side terminal, based on a control signal from the electronic control unit 200. The primary-side terminal of the boost converter 81 is connected to an output terminal of the battery 70, while the secondary-side terminal is connected to direct current-side terminals of the first inverter 82 and the second inverter 83.

The first inverter 82 and the second inverter 83 each include an electrical circuit which can convert a direct current input from the direct current-side terminal into an alternating current (three-phase alternating current in the present embodiment) and output the converted current from an alternating current-side terminal, based on a control signal from the electronic control unit 200, and which can conversely convert the alternating current input from the alternating current-side terminal into a direct current, and output the converted current from the direct current-side terminal, based on a control signal from the electronic control unit 200. The direct current-side terminal of the first inverter 82 is connected to the secondary-side terminal of the boost converter 81, and the alternating current-side terminal of the first inverter 82 is connected to input output terminals of the first rotary electric machine 50. The direct current-side terminal of the second inverter 83 is connected to the secondary-side terminal of the boost converter 81, and the alternating current-side terminal of the second inverter 83 is connected to input output terminals of the second rotary electric machine 60.

The electronic control unit 200 is configured from a digital computer including a read-only memory (ROM) 202, a random-access memory (RAM) 203, a microprocessor (CPU) 204, an input port 205, and an output port 206, which are connected with each other through a bidirectional bus 201.

Output signals of the air flowmeter 211 and the like, as well as output signals of a vehicle speed sensor 215 for detecting vehicle speed, an SOC sensor 216 for detecting a battery state of charge, an outside temperature sensor 217 for detecting outside temperature, and the like, are input into the input port 205 through corresponding AD converters 207. An output voltage of the load sensor 221 which generates an output voltage proportional to a depression amount (hereinafter "accelerator depression amount") of the accelerator pedal 220 is also input into the input port 205 through a corresponding AD converter 207. As a signal for calculating engine speed, an output signal of a crank angle sensor 222 is also input into the input port 205, the crank angle sensor 222 being configured to generate an output pulse whenever the crankshaft of the engine body 1 rotates 15 degrees, for example. Thus, the output signals of various sensors required for controlling the vehicle 110 are input into the input port 205.

The output port 206 is electrically connected to control components, such as the fuel injection valves 13, through the corresponding drive circuits 208.

Based on the output signals of the various sensors input into the input port 205, the electronic control unit 200 outputs control signals for controlling the control components from the output port 206, so as to control the vehicle 110. Hereinafter, the control of the vehicle 110 performed by the electronic control unit 200 will be described.

The electronic control unit 200 sets a travel mode of the vehicle 110 based on the battery state of charge. Specifically, when the battery state of charge is larger than a prescribed mode-switching state of charge (for example, 25% of the full state of charge), the electronic control unit 200 sets the travel mode of the vehicle 110 to an electric vehicle (EV) mode. The EV mode may also be referred to as a charge depleting (CD) mode.

When the travel mode of the vehicle 110 is set to the EV mode, the electronic control unit 200 basically performs powering driving of the second rotary electric machine 60 with the charging electric power of the battery 70 in the state where the internal combustion engine 100 is stopped, and rotates the wheel drive shaft 112 only with the motive power of the second rotary electric machine 60. When a prescribed engine operation condition is established, the electronic control unit 200 exceptionally operates the internal combustion engine 100 to rotate the wheel drive shaft 112 with the motive power of both the internal combustion engine 100 and the second rotary electric machine 60.

The engine operation condition in the EV mode is set from a perspective of securing traveling performance of the vehicle 110, or protecting components. Examples of the engine operation condition includes that the vehicle speed becomes a prescribed vehicle speed (for example, 100 km/h) or more, the accelerator depression amount increases to the level that a vehicle request output Pt set based on the accelerator depression amount (vehicle load) and on the vehicle speed becomes a prescribed output or more (typically, a sudden acceleration request is made), and that battery temperature becomes a prescribed temperature (for example, −10° C.) or less.

Thus, the EV mode is the mode where powering driving of the second rotary electric machine 60 is performed by preferentially using the charging electric power of the battery 70, and the motive power of at least the second rotary electric machine 60 is transmitted to the wheel drive shaft 112 to achieve traveling of the vehicle 110.

When the battery state of charge is equal to or less than the mode-switching state of charge, the electronic control unit 200 sets the travel mode of the vehicle 110 to a hybrid vehicle (HV) mode. The HV mode may also be referred to as a charge sustaining (CS) mode.

When the travel mode of the vehicle 110 is set to the HV mode, the electronic control unit 200 divides the motive power of the internal combustion engine 100 into two systems with the power split device 40, and transmits divided one motive power of the internal combustion engine 100 to the wheel drive shaft 112, and regeneratively drives the first rotary electric machine 50 with the other motive power. Basically, powering driving of the second rotary electric machine 60 is performed with the electric power generated by the first rotary electric machine 50, and the motive power of the second rotary electric machine 60 is also transmitted to the wheel drive shaft 112 together with the one motive power of the internal combustion engine 100. In an exceptional case where, for example, the accelerator depression amount increases, and the vehicle request output becomes the prescribed output or more, powering driving of the second rotary electric machine 60 is performed for securing the traveling performance of the vehicle 110 with use of the electric power generated by the first rotary electric machine 50 and the charging electric power of the battery 70, and the motive power of both the internal combustion engine 100 and the second rotary electric machine 60 is transmitted to the wheel drive shaft 112.

Thus, the HV mode is the mode where the internal combustion engine 100 is operated, powering driving of the second rotary electric machine 60 is performed by preferentially using the electric power generated by the first rotary electric machine 50, and the motive power of both the second rotary electric machine 60 and the internal combustion engine 100 is transmitted to the wheel drive shaft 112 to achieve traveling of the vehicle 110.

Thus, in the hybrid vehicle, the internal combustion engine 100 is basically started up, when the travel mode switches from the EV mode to the HV mode. The switching from the EV mode to the HV mode is basically dependent on the battery state of charge.

Now, in order for the catalyst device 33 to demonstrate a desired exhaust gas control performance during operation of the internal combustion engine 100, it is necessary to increase the temperature of the catalyst carried on the conductive base material 35 to an active temperature so as to activate the catalyst. Hence, in order to restrain deterioration of the exhaust emission after the startup of the engine, it is desirable to start energization of the conductive base material 35 and start warm up of the catalyst device 33 during the EV mode so as to complete the warm up of the catalyst device 33 before the EV mode switches to the HV mode. Accordingly, in the present embodiment, when the battery state of charge lowers to a warm-up starting state of charge that is larger than the mode-switching state of charge during the EV mode, energization of the conductive base material 35 is started to warm up the catalyst device 33.

At the time, condensed water, generated in the exhaust passage during engine stop, may adhere to the surface of the exhaust gas circulation passages 35a (see FIG. 3A) of the conductive base material 35. When the material forming the conductive base material 35 is a porous material, that is, when the conductive base material 35 is a porous body, the condensed water generated in the exhaust passage during engine stop may enter into the conductive base material 35 and remain there.

Thus, when energization of the conductive base material 35 is started to warm up the catalyst device 33 in the state where water is present on the surface and inside of the conductive base material 35, that is, in the state where water is present inside the catalyst device 33, there is a possibility that following phenomenon may occur.

FIGS. 3A to 3C are explanatory views of the phenomenon occurring when energization of the conductive base material 35 is started to warm up the catalyst device 33 in the state where water is present on the surface and inside of the conductive base material 35.

FIG. 3A is a partially enlarged sectional view of the catalyst device 33 obtained by cutting the catalyst device 33 at right angles to the flow of exhaust gas. FIG. 3B shows transition of temperature in respective regions of the conductive base material 35, when the temperature of the conductive base material 35 is increased from an initial temperature that is equivalent to outside temperature to an active temperature. A solid line of FIG. 3B shows transition of the temperature in a region (hereinafter referred to as "base material dry region") where water is not present on the surface or inside of the conductive base material 35. A broken line of FIG. 3B shows transition of the temperature in a region (hereinafter referred to as "base material wet region") where water is present on the surface or inside of the conductive base material 35. FIG. 3C shows transition of a temperature difference (hereinafter referred to as "internal temperature difference") $\Delta T$ between the base material dry region and the base material wet region on the surface and inside of the conductive base material 35.

As shown with the solid line of FIG. 3B, the temperature of the conductive base material 35 increases in a substantially monotonic manner with the passage of time in the base material dry region. Contrary to this, as shown with the broken line of FIG. 3B, in the base material wet region, there is a stagnant period where the temperature of the conductive base material 35 stagnates in a prescribed temperature zone in the vicinity of the evaporation temperature of water. This is because when the temperature of the conductive base material 35 reaches the vicinity of the evaporation temperature of water, water evaporates in the base material wet region, and the latent heat of vaporization at that time prevents temperature increase in the base material wet region.

As a result, as shown in FIG. 3C, when energization of the conductive base material 35 is started to warm up the catalyst device 33 in the state where water is present on the surface or inside of the conductive base material 35, the internal temperature difference $\Delta T$ is generated. As the water content partially present on the surface and inside of the conductive base material 35, that is, an internal water content Qcw of the catalyst device 33 becomes larger, the evaporation time becomes longer, and the stagnant period also becomes longer. As a result, the internal temperature difference $\Delta T$ becomes larger. As the internal temperature difference $\Delta T$ becomes larger, a larger thermal stress is generated thereby, and this causes deterioration of the conductive base material 35.

As a method for restraining the deterioration of the conductive base material 35 attributed to excessive increase in the internal temperature difference $\Delta T$, it may be considered to lower the electric power (base material electric power supply) supplied to the conductive base material 35 and thereby reducing a heating rate of the base material dry region during the stagnant period.

Here, in JP 2011-231710 A, the base material electric power supply is lowered in order to restrain generation of bumping, when water is present inside the conductive base material 35. In this method, however, the warm up time of the catalyst device 33 is prolonged. As a solution, the base material electric power supply is increased as much as possible in the range where generation of bumping can be restrained. As a consequence, while generation of bumping can be restrained, it is difficult to sufficiently reduce the heating rate of the base material dry region during the stagnant period, so that the internal temperature difference $\Delta T$ may become large enough to deteriorate the conductive base material 35. Therefore, the above method is not sufficient as a measure against the deterioration of the conductive base material 35 attributed to the excessive increase in the internal temperature difference $\Delta T$.

Accordingly, in the present embodiment, in order to prevent the internal temperature difference $\Delta T$ from becoming equal to or more than a prescribed temperature difference (hereinafter referred to as "deterioration temperature difference") $\Delta T$th which may cause deterioration of the conductive base material 35, the base material electric power supply during the stagnant period is controlled, based on the internal water content Qcw of the catalyst device 33, to be the electric power that is lower than a target value Wn [kW] of the base material electric power supply in the normal state (hereinafter "normal electric power supply"), such as when water is not present inside the catalyst device 33. Hereinafter, energization control of the conductive base material 35 in the present embodiment will be described.

Figure 4:
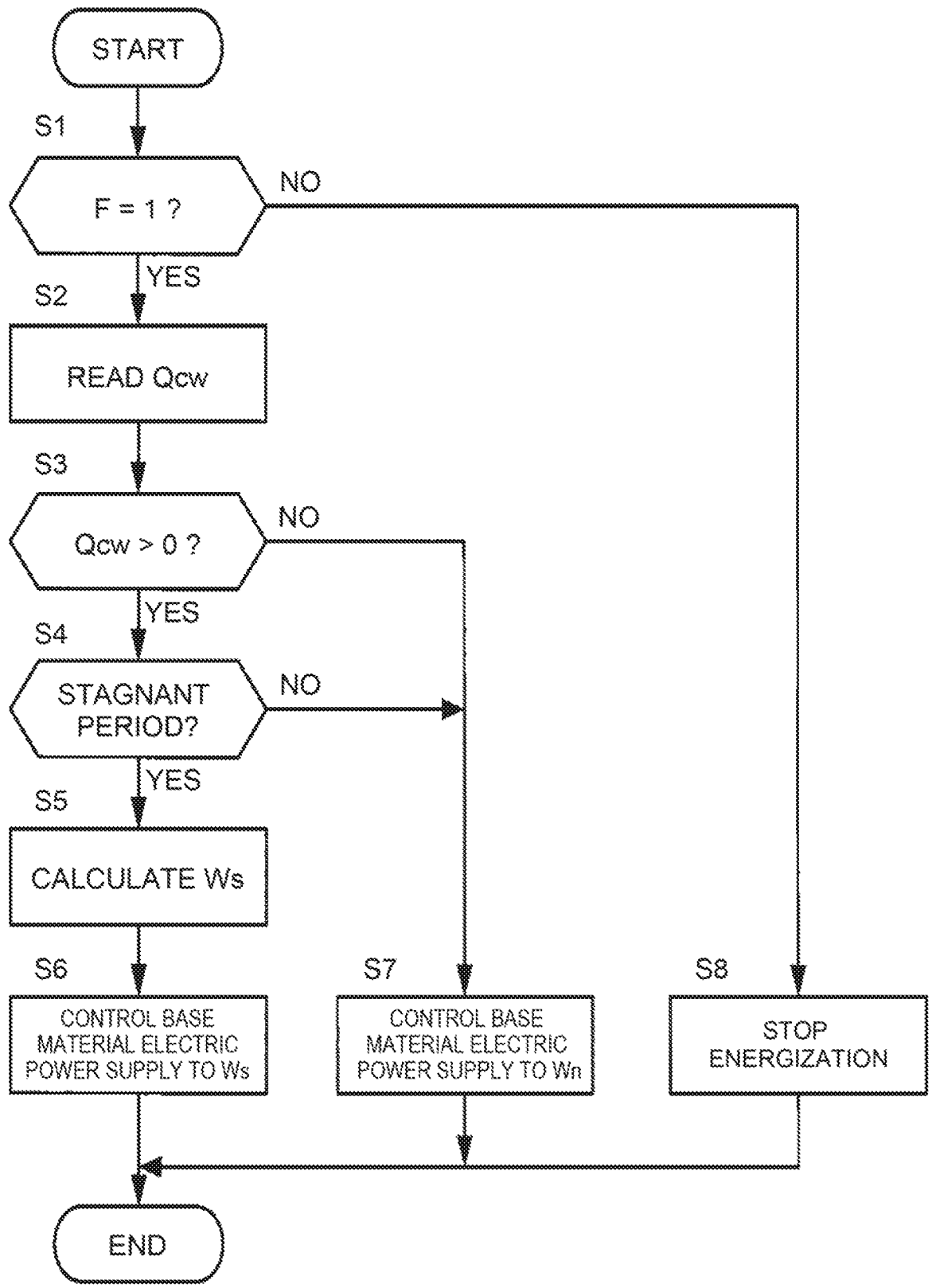
FIG. 4 is a flowchart illustrating energization control of the conductive base material in the first embodiment of the present disclosure.

FIG. 4 is a flowchart illustrating energization control of the conductive base material 35 in the present embodiment. The electronic control unit 200 repeatedly executes the present routine in a prescribed operation period during one trip of the vehicle.

In step S1, the electronic control unit 200 determines whether or not an energization execution flag F is set to "1". The energization execution flag F is a flag set such that when it is necessary to perform energization of the conductive base material 35, the flag is set to "1", whereas when it is not necessary to perform energization of the conductive base material 35, the flag is set to "0". The energization execution flag F has an initial value of "0". The electronic control unit 200 performs setting control of the energization execution flag F, separately from the present routine. For example, when the temperature of the conductive base material 35 (hereinafter referred to as "base material temperature") is less than a prescribed active base material temperature (temperature which allows determination that the catalyst carried on the conductive base material 35 is active), and when the battery state of charge is equal to or less than the warm-up starting state of charge, the energization execution flag is set to "1".

The base material temperature is the temperature of the base material dry region estimated by the electronic control unit 200. In the present embodiment, the electronic control unit 200 calculates the base material temperature based on parameters, such as the electric power amount supplied to the conductive base material 35, the temperature of the exhaust gas flowing into the catalyst device 33 detected by the exhaust temperature sensor 213, and the lapsed time after stopping the internal combustion engine 100. However, calculation of the base material temperature is not limited to such a method, and various publicly-known methods may be used.

When the energization execution flag F is set to "1", the electronic control unit 200 moves to the process of step S2. On the contrary, when the energization execution flag F is set to "0", the electronic control unit 200 moves to the process of step S8.

In step S2, the electronic control unit 200 reads the internal water content Qcw of the catalyst device 33, which is calculated separately from the present routine. The calculation method of the internal water content Qcw will be described later with reference to FIG. 6.

In step S3, the electronic control unit 200 determines whether or not water is present inside the catalyst device 33. Specifically, the electronic control unit 200 determines whether or not the internal water content Qcw is larger than zero. When the internal water content Qcw of the electronic control unit 200 is larger than zero, the electronic control unit 200 determines that water is present inside the catalyst device 33, and moves to the process of step S4. Contrary to this, when the internal water content Qcw is zero, the electronic control unit 200 determines that water is not present inside the catalyst device 33, and moves to the process of step S7.

In the present embodiment, when the internal water content Qcw is larger than zero as described above, the process proceeds to step S4. However, when water is present inside the catalyst device 33 but the water content is small, the water present inside the catalyst device 33 can all be evaporated before the internal temperature difference ΔT becomes the deterioration temperature difference ΔTth, even if the base material electric power supply should be controlled to normal electric power supply Wn. Hence, an internal water content (hereinafter referred to as "deterioration determination water content") Qth, where the internal temperature difference ΔT becomes equal to or more than the deterioration temperature difference ΔTth when the base material electric power supply is controlled to be the normal electric power supply Wn, may be obtained by an experiment or the like in advance. When the internal water content Qcw is larger than the deterioration determination water content Qth, the process may proceed to step S4.

In step S4, the electronic control unit 200 determines whether or not water evaporates in the base material wet region, that is, whether or not the base material wet region is in the stagnant period. In the present embodiment, when the base material temperature is equal to or more than the prescribed evaporation base material temperature, the electronic control unit 200 determines that the base material wet region is in the stagnant period. When the base material temperature is less than the evaporation base material temperature, the electronic control unit 200 determines that the base material wet region is not in the stagnant period, and moves to the process of step S7.

The evaporation base material temperature is the temperature that allows determination that the water present on the surface or inside of the conductive base material 35 evaporates. In the present embodiment, the evaporation base material temperature is set to a temperature (for example, 95° C.) that is slightly lower than the evaporation temperature of water. This is because a certain degree of temperature variation may occur inside the conductive base material 35 due to, for example, energization distribution difference or other factors, and even when the temperature in one portion of the conductive base material 35 is 95° C., the temperature of the other portion may reach the evaporation temperature of water. However, without being limited to the above temperature, the evaporation base material temperature may be set to a temperature slightly higher than the evaporation temperature of water, for example. That is, the base material wet region may be determined to be in the stagnant period, at the stage where a certain degree of temperature difference occurs between the base material temperature (temperature of the base material dry region) and the temperature of the base material wet region.

Figure 5:
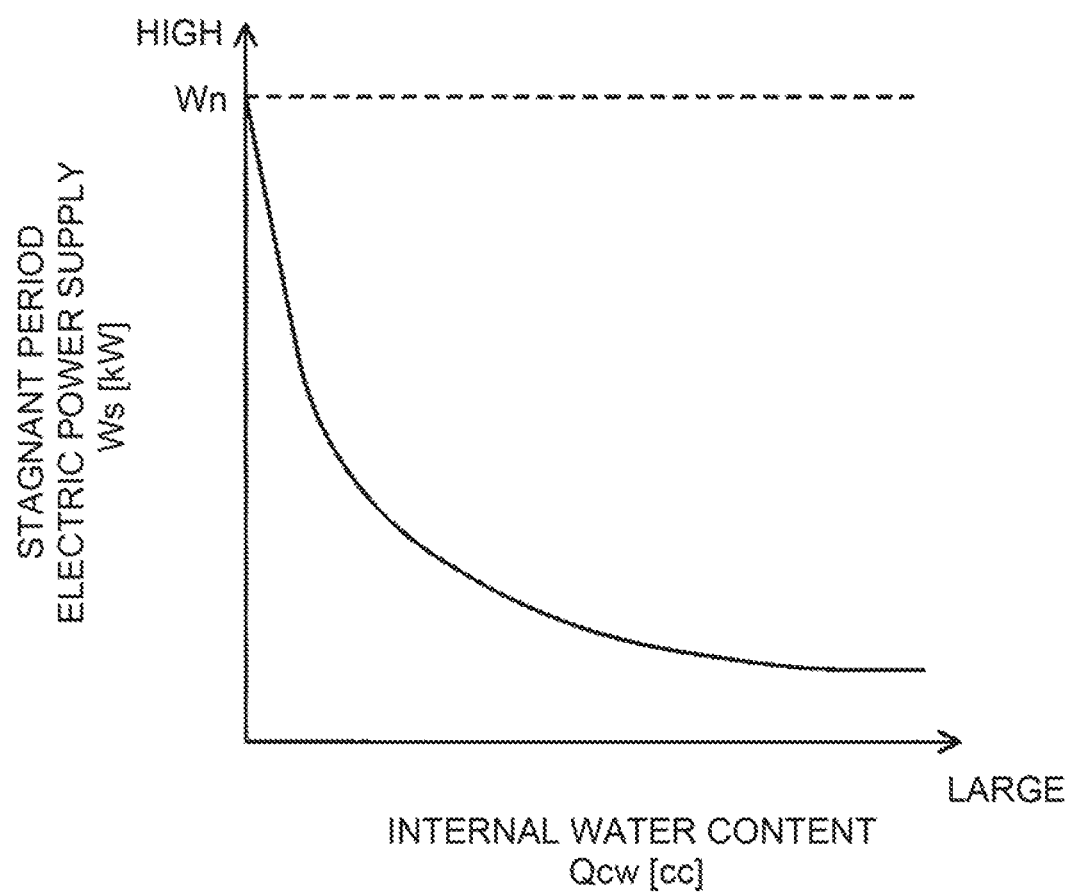
FIG. 5 is a table for calculating a stagnant period electric power supply Ws used as a target value of the electric power supplied to the conductive base material during the stagnant period based on an internal water content Qcw.

In step S5, the electronic control unit 200 calculates stagnant period electric power supply Ws [kW] used as a target value of the electric power (base material electric power supply) supplied to the conductive base material 35 during the stagnant period, based on the internal water content Qcw, with reference to a table of the FIG. 5 that is prepared in advance by an experiment or the like. As shown in FIG. 5, the stagnant period electric power supply Ws [kW] is set to a value lower than the normal electric power supply Wn, and when the internal water content Qcw is large, the stagnant period electric power Ws [kW] is set to a lower value than when the internal water content Qcw is small. This is because as the internal water content Qcw is larger, the stagnant period becomes longer, and therefore the stagnant period electric power supply Ws needs to be lowered accordingly in order to reduce the heating rate of the base material dry region.

In step S6, the electronic control unit 200 controls the voltage regulation circuit 38 such that the base material electric power supply becomes the stagnant period electric power supply Ws.

In step S7, the electronic control unit 200 controls the voltage regulation circuit 38 such that the base material electric power supply becomes the normal electric power supply Wn. The normal electric power supply Wn is a prescribed value determined in advance, the prescribed value being set to a highest possible value in order to shorten the warm up time of the catalyst device 33.

In step S8, the electronic control unit 200 stops energization, when energization of the conductive base material 35 is in operation. When the energization is not in operation, the electronic control unit 200 ends the process of the present time immediately.

Figure 6:
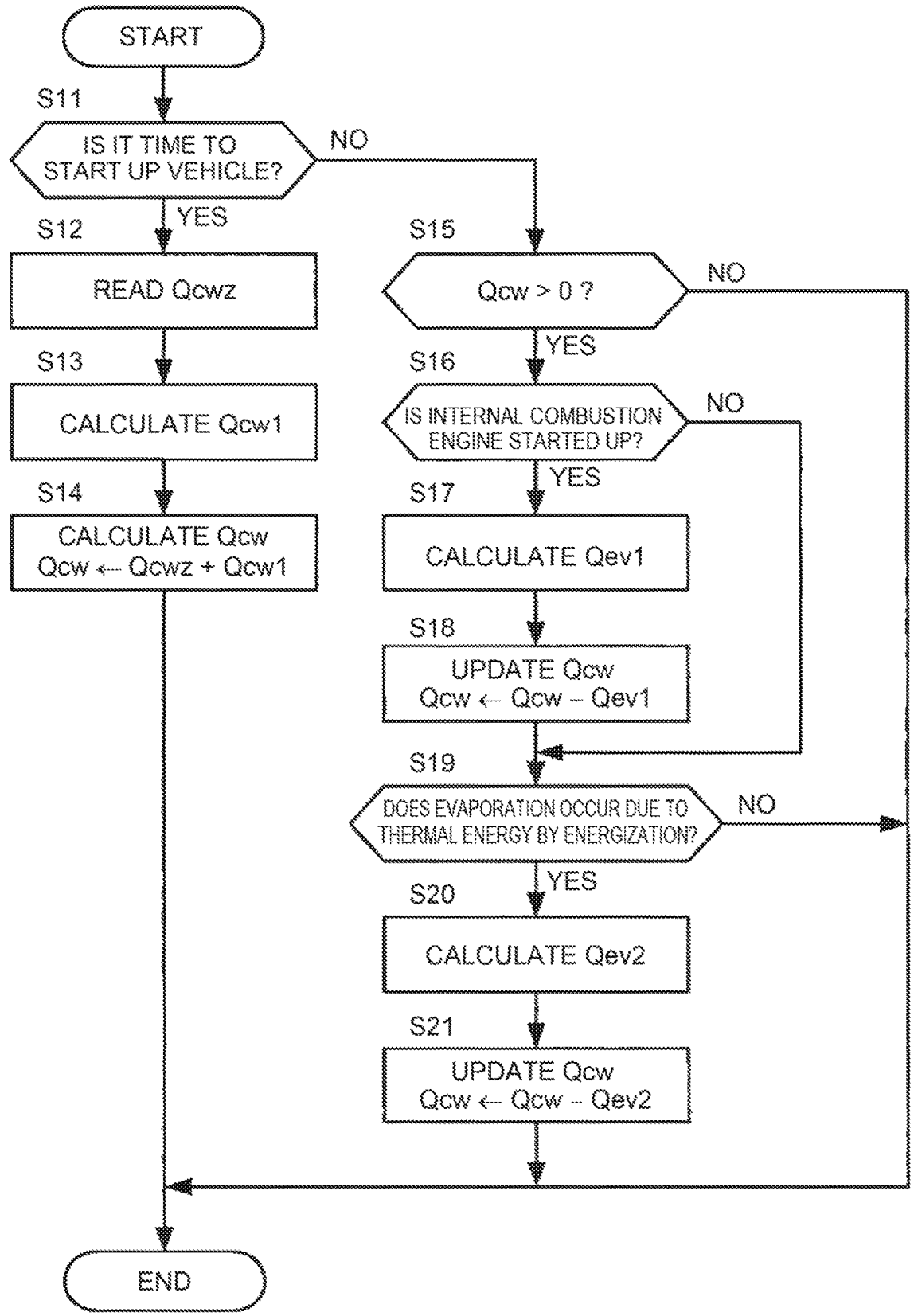
FIG. 6 is a flowchart illustrating calculation control of the internal water content Qcw of the catalyst device.

FIG. 6 is a flowchart illustrating calculation control of the internal water content Qcw of the catalyst device 33. The electronic control unit 200 repeatedly executes the present routine in a prescribed operation cycle during the time after a vehicle start switch is turned on and before the vehicle start switch is turned off. The vehicle start switch is a switch which is turned on when the vehicle is started up and which is turned off when the vehicle is stopped.

In step S11, the electronic control unit 200 determines whether or not it is the time to start up the vehicle (i.e., whether or not it is the time when the vehicle start switch is turned on). When it is the time to start up the vehicle, the electronic control unit 200 moves to the process of step S12. When it is not the time to start up the vehicle, the electronic control unit 200 moves to the process of step S15.

In step S12, the electronic control unit 200 reads an internal water content previous value Qcwz. In the present embodiment, the electronic control unit 200 reads the internal water content Qcw stored in the RAM 203 at previous vehicle stop time (i.e., when the vehicle start switch is turned off previously) as the internal water content previous value Qcwz.

In step S13, the electronic control unit 200 calculates an estimated amount (hereinafter referred to as "generated water content estimated amount") Qcw1 of the condensed water generated inside the catalyst device 33 during the time from previous vehicle stop time to present vehicle startup time. In the present embodiment, the electronic control unit 200 calculates the generated water content estimated amount Qcw1 based on the base material temperature at the previous vehicle stop time, the base material temperature at the present vehicle startup time, and the outside temperature. The generated water content estimated amount Qcw1 tends to become larger, as a temperature difference between the base material temperature at the previous vehicle stop time and the base material temperature at the present vehicle startup time becomes larger.

In step S14, the electronic control unit 200 adds the generated water content estimated amount Qcw1 to the internal water content previous value Qcwz to calculate an internal water content Qcw, and stores the calculated internal water content Qcw in the RAM 203.

In step S15, the electronic control unit 200 reads the internal water content Qcw stored in the RAM 203, and determines whether or not the internal water content Qcw is larger than zero. When the internal water content Qcw is larger than zero, the electronic control unit 200 moves to the process of step S16. When the internal water content Qcw is zero, the electronic control unit 200 ends the process of the present time.

In step S16, the electronic control unit 200 determines whether or not the internal combustion engine 100 is started up. When the internal combustion engine 100 is started up, the electronic control unit 200 moves to the process of step S17. When the internal combustion engine 100 is stopped, the electronic control unit 200 moves to the process of step S19.

In step S17, the electronic control unit 200 calculates an estimated value (hereinafter referred to as "first evaporated water content") Qev1 of the water content per unit time that is evaporated inside the catalyst device 33 by exhaust heat. In the present embodiment, the electronic control unit 200 calculates the first evaporated water content Qev1 based on the temperature of the exhaust gas flowing into the catalyst device 33 that is detected by the exhaust temperature sensor 213, with reference to a table prepared by an experiment or the like in advance.

In step S18, the electronic control unit 200 subtracts the first evaporated water content Qev1 from the internal water content Qcw to update the value of the internal water content Qcw.

In step S19, the electronic control unit 200 determines whether or not evaporation occurs in the conductive base material 35 with the thermal energy fed to the conductive base material 35 by energization. In the present embodiment, when energization of the conductive base material 35 is performed, and the base material temperature is equal to or more than the evaporation base material temperature, the electronic control unit 200 determines that evaporation occurs with the thermal energy by energization and moves to the process of step S20. Otherwise, the electronic control unit 200 determines that evaporation does not occur with the thermal energy by energization, and ends the process of the present time.

In step S20, the electronic control unit 200 calculates an estimated value (hereinafter referred to as "second evaporated water content") Qev2 of the water content per unit time that is evaporated by thermal energy fed to the conductive base material 35 by energization. In the present embodiment, the electronic control unit 200 calculates the second evaporated water content Qev2 based on the thermal energy (i.e., base material electric power supply) [kJ] per unit time that is fed to the conductive base material 35 by energization, and latent heat of vaporization [kJ/cc] per unit mass of water.

In step S21, the electronic control unit 200 subtracts the second evaporated water content Qev2 from the internal water content Qcw to update the value of the internal water content Qcw.

Figure 7:
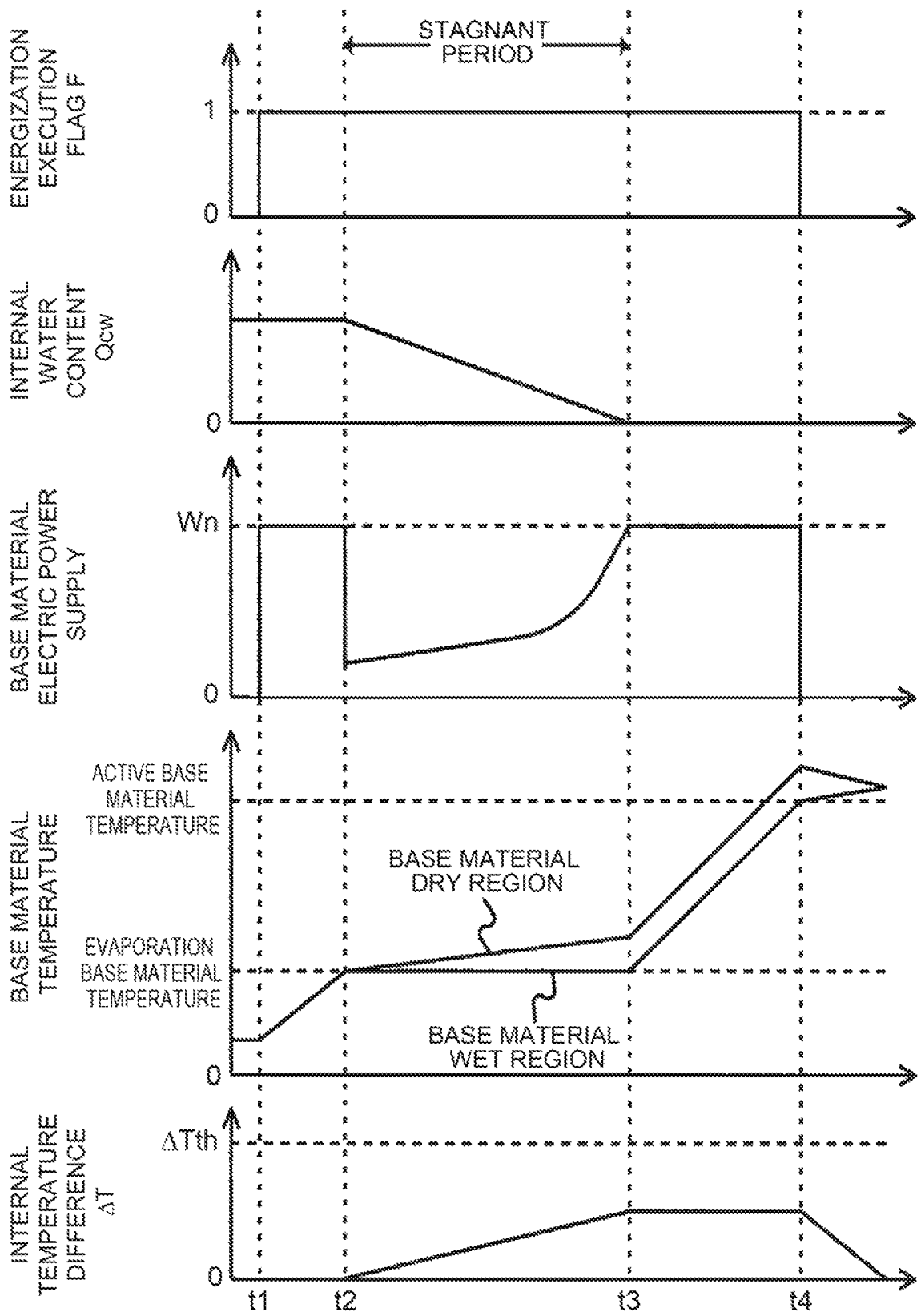
FIG. 7 is a time chart illustrating operation of the energization control of the conductive base material in the first embodiment of the present disclosure.

FIG. 7 is a time chart illustrating operation of the energization control of the conductive base material 35 in the present embodiment. Note that FIG. 7 shows the operation in the scene where the travel mode of the vehicle 110 is set to the EV mode, and the vehicle 110 travels with the motive power of the second rotary electric machine 60 using the charging electric power of the battery 70.

At time t1, when the base material temperature is lower than the active base material temperature, and in this state, the battery state of charge becomes equal to or less than the warm-up starting state of charge, the energization execution flag F is set to "1", and the energization of the conductive base material 35 is started.

In this case, at time t1, the internal water content Qcw is larger than zero, so that water is present inside the catalyst device 33, though the base material temperature is less than the evaporation base material temperature. Accordingly, it is determined that the catalyst device 33 is not in the stagnant period, and the base material electric power supply is controlled to the normal electric power supply Wn. Hence, after time t1, the base material temperature increases gradually.

At time t2, the base material temperature reaches the evaporation base material temperature, and it is determined that the catalyst device 33 is in the stagnant period. Accordingly, the base material electric power supply is controlled to the stagnant period electric power supply Ws corresponding to the internal water content Qcw. Hence, after time t2, the heating rate of the base material dry region can be controlled to a heating rate corresponding to the internal water content Qcw.

In the present embodiment, the stagnant period electric power supply Ws is set to a value lower than the normal electric power supply Wn, and when the internal water content Qcw is large, the stagnant period electric power supply Ws is set to a lower value than when the internal water content Qcw is small. Hence, after time t2, the heating rate of the base material dry region can be made lower than the heating rate before time t2. In addition, when the internal water content Qcw is large, the heating rate of the base material dry region can be made lower than the heating rate when the internal water content Qcw is small. Therefore, it becomes possible to restrain increase in the internal temperature difference ΔT to the level of the deterioration temperature difference ΔTth or more during the stagnant period.

At time t3, the internal water content Qcw becomes zero, so that water is not present inside the catalyst device 33. Hence, the stagnant period is determined to be expired, and the base material electric power supply is again controlled to the normal electric power supply Wn. At time t4, the electric power supply from time t3 becomes equal to or more than the prescribed electric power supply that can increase the base material temperature from the evaporation base material temperature to the active base material temperature. Once the temperature of the base material wet region reaches the active base material temperature, the energization execution flag F is set to "0", and energization of the conductive base material 35 is stopped.

The vehicle 110 in the present embodiment described in the foregoing includes: the internal combustion engine 100; the electrically-heated catalyst device 33; and the electronic control unit 200 (control device). The electrically-heated catalyst device 33 includes: the conductive base material 35 that generates heat upon being energized, the conductive base material 35 being provided in an exhaust passage of the internal combustion engine 100; and a catalyst heated through the conductive base material 35. The electronic control unit 200 is configured to include: a base material electric power supply control unit that controls base material electric power supply supplied to the conductive base material 35; and a determination unit that determines whether or not the conductive base material 35 is in a stagnant period where the temperature of the conductive base material 35 partially stagnates in a prescribed temperature zone, the stagnant period occurring when water is present inside the catalyst device 33 in a process of increase in temperature of the conductive base material 35. When determining that the conductive base material 35 is in the stagnant period, the base material electric power supply control unit is configured to control the base material electric power supply to be lower than when determining that the conductive base material 35 is not in the stagnant period.

As a result, even in the case where the conductive base material 35 is heated in the state where water is present inside the catalyst device 33, the heating rate of the base material dry region can be reduced when the conductive base material 35 is determined to be in the stagnant period. This makes it possible to restrain deterioration of the conductive base material 35 attributed to bumping, and to restrain an excessive increase in the internal temperature difference $\Delta T$. As a result, deterioration of the conductive base material 35 attributed to the excessive increase in the internal temperature difference $\Delta T$ can also be restrained. Therefore, it is possible to restrain deterioration of the base material caused when the base material is heated in the state where water is present inside the catalyst device 33.

The electronic control unit 200 in the present embodiment is configured to further include an internal water content calculation unit that calculates an internal water content Qcw that is a water content present inside the catalyst device 33. The determination unit may be configured to determine that the conductive base material 35 is in the stagnant period, when the internal water content Qcw is larger than zero, and the temperature of the conductive base material 35 is equal to or more than a evaporation base material temperature (prescribed temperature) that allows determination that the water present inside the catalyst device 33 is evaporated. This makes it possible to determine that the conductive base material 35 is in the stagnant period with sufficient accuracy.

The determination unit may be configured to determine that the conductive base material 35 is in the stagnant period, when the internal water content Qcw is equal to or more than a deterioration determination water content Qth (prescribed water content), and the temperature of the conductive base material 35 is equal to or more than the evaporation base material temperature (prescribed temperature) that allows determination that the water present inside the catalyst device 33 is evaporated. Here, the deterioration determination water content Qth is a water content where an internal temperature difference $\Delta T$, generated between a region where water is present and a region where water is not present in the conductive base material 35 in the process of increase in temperature of the conductive base material 35 when the base material electric power supply is controlled to be a prescribed normal electric power supply Wn, becomes equal to or more than a prescribed deterioration temperature difference $\Delta T th$, the prescribed normal electric power supply Wn being supplied to the conductive base material 35 when the conductive base material 35 is determined not in the stagnant period.

This makes it possible to reduce the risk that the conductive base material 35 is determined to be in the stagnant period and the base material electric power supply is lowered, although there is no possibility that the internal temperature difference $\Delta T$ becomes equal to or more than the deterioration temperature difference $\Delta T th$. As a result, it is possible to restrain a prolonged warm up time of the catalyst device 33.

When determining that the conductive base material 35 is in the stagnant period, the base material electric power supply control unit in the present embodiment may be configured to control the base material electric power supply to be lower than when determining that the conductive base material 35 is not in the stagnant period, based on the internal water content Qcw. When the internal water content Qcw is large, the base material electric power supply control unit is further configured to control the base material electric power supply to be lower than when the internal water content is small.

Thus, the heating rate of the base material dry region can be controlled to the heating rate corresponding to the internal water content Qcw. Specifically, as the internal water content Qcw becomes larger, the heating rate of the base material dry region can be reduced more. As the internal water content Qcw becomes larger, the time required to evaporate all the water becomes longer, so that there is a tendency that the stagnant period becomes longer, and the internal temperature difference $\Delta T$ becomes larger. However, when the heating rate of the base material dry region is reduced more, as the internal water content Qcw becomes larger as described above, it is possible to effectively restrain an excessive increase in the internal temperature difference $\Delta T$.

Second Embodiment

Now, a second embodiment of the present disclosure will be described. The present embodiment is different from the first embodiment in the content of energization control of the conductive base material 35. Hereinbelow, the difference will mainly be described.

In the first embodiment described before, when the conductive base material 35 is determined to be in the stagnant period, the base material electric power supply is controlled to be the stagnant period electric power supply Ws corresponding to the internal water content Qcw. The stagnant period electric power supply Ws is basically made lower, as the internal water content Qcw becomes larger.

Contrary to this, in the present embodiment, the stagnant period electric power supply Ws is set as a prescribed value determined in advance, the prescribed value being lower than the normal electric power supply Wn. To use the prescribed stagnant period electric power supply Ws, a period of time (hereinafter referred to as "low electric power control time") ts [s] for controlling the base material electric power supply to be the stagnant period electric power supply Ws is calculated based on the internal water content Qcw.

Hereinafter, energization control of the conductive base material 35 in the present embodiment will be described.

Figure 8:
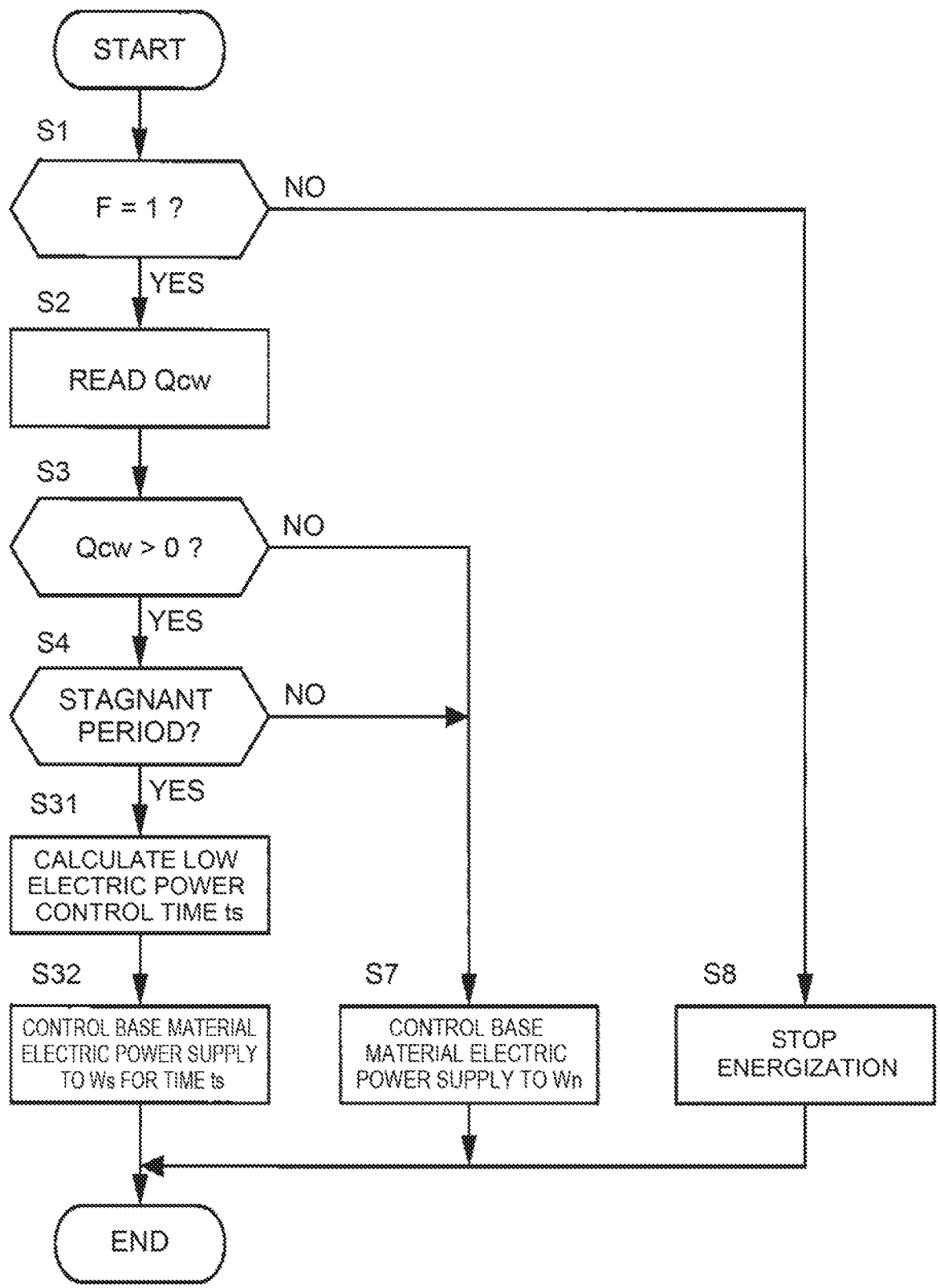
FIG. 8 is a flowchart illustrating the energization control of the conductive base material in a second embodiment of the present disclosure.

FIG. 8 is a flowchart illustrating energization control of the conductive base material 35 in the present embodiment. The electronic control unit 200 repeatedly executes the present routine in a prescribed operation cycle during one trip of the vehicle. In the flowchart of FIG. 8, the contents of the processes from steps S1 to S4, and step S7, S8 are similar to those of the first embodiment, and therefore description thereof will be omitted here.

Figure 9:
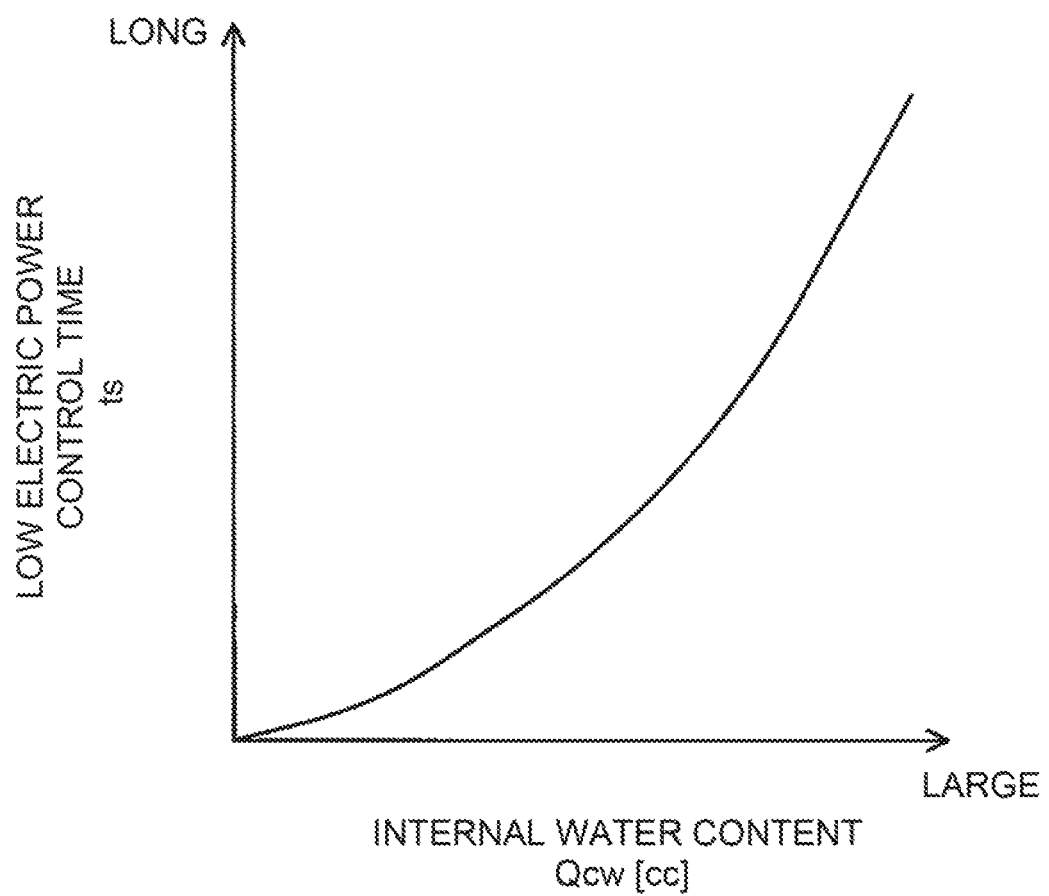
FIG. 9 is a table for calculating a low electric power control time is based on the internal water content Qcw.

In step S31, the electronic control unit 200 calculates low electric power control time ts based on the internal water content Qcw, with reference to a table of FIG. 9 that is prepared by an experiment or the like in advance. As shown in FIG. 5, when the internal water content Qcw is large, the low electric power control time ts is set to a larger value than when the internal water content Qcw is small. This is because when the base material electric power supply in the stagnant period is set to a prescribed value determined in advance, the time required to evaporate all the water becomes longer as the internal water content Qcw becomes larger.

In step S32, the electronic control unit 200 controls the voltage regulation circuit 38 such that the base material electric power supply becomes the stagnant period electric power supply Ws that is preset to be lower than the normal electric power supply Wn until the lapse of the low electric power control time ts. In the present embodiment, the stagnant period electric power supply Ws that is a target value of the base material electric power supply set during the stagnant period is set to an electric power value that keeps the internal temperature difference ΔT within the deterioration temperature difference ΔTth, even when the internal water content Qcw is an assumed maximum value, and all the maximum amount of water is evaporated by controlling the base material electric power supply to be the stagnant period electric power supply Ws.

The base material electric power supply control unit included in the electronic control unit 200 (control device) in the present embodiment described in the foregoing is configured to control, when determining that the conductive base material 35 is in the stagnant period, the base material electric power supply to be a prescribed stagnant period electric power supply Ws (prescribed electric power) that is lower than the prescribed normal electric power supply Wn supplied to the conductive base material 35 when determining that the conductive base material 35 is not in the stagnant period for the low electric power control time ts (prescribed time). When the internal water content Qcw is large, the base material electric power supply control unit is configured to control the low electric power control time ts to be longer than when the internal water content Qcw is small. With this configuration, the same effect as in the first embodiment can be obtained, and deterioration of the base material, which occurs when the base material is heated in the state where water is present inside the catalyst device 33, can be restrained.

Although the embodiments of the present disclosure have been described in the foregoing, the embodiments are merely representatives of some of the application examples of the present disclosure, and are not intended to restrict the technical scope of the present disclosure to the specific configuration of the embodiments disclosed.

For example, in the first embodiment, the electronic control unit 200 determines whether or not the internal water content Qcw is larger than zero, that is, whether or not water is present inside the catalyst device 33. When water is present inside the catalyst device 33, and the base material temperature becomes the prescribed evaporation base material temperature or more, the electronic control unit 200 determines that the conductive base material 35 is in the stagnant period. However, in a simpler configuration, on the assumption that water is present inside the catalyst device 33, the electronic control unit 200 may determine, without calculation of the internal water content Qcw, that the conductive base material 35 is in the stagnant period, when the base material temperature becomes the prescribed evaporation base material temperature or more, irrespective of the presence of water inside the catalyst device 33. The electronic control unit 200 may control, for the prescribed time determined in advance, the base material electric power supply to be the prescribed electric power that is lower than the normal electric power supply Wn. In this case, the stagnant period electric power supply Ws set in the second embodiment is used as the prescribed electric power, and the maximum value of the low electric power control time is calculated based on the internal water content Qcw in the second embodiment may be used as the prescribed time.

Each of the embodiments has been described with the hybrid vehicle as an example. However, in a vehicle including only the internal combustion engine 100 as a power source, the time to start up the internal combustion engine 100 may be predicted, and the energization control described in each of the embodiments may be performed before the internal combustion engine 100 is started up. The time, such as a period of time until the internal combustion engine 100 is started up after the door of the vehicle is opened, and a period of time until the internal combustion engine 100 is started up after a driver sits on the driver's seat of the vehicle, or the like, is the time predetermined to some extent. Hence, the time when the internal combustion engine 100 is started up can be predicted by detecting, for example, opening of the door of the vehicle, or the driver sitting on the driver's seat of the vehicle. In the case where the electronic control unit 200 is configured to be communicable with an external crowd server, data such as past travel information on an own vehicle collected in the crowd server, can be acquired from the crowd server, and the time when the internal combustion engine 100 is started up can also be estimated from the travel information.

What is claimed is:

1. A vehicle comprising:
   an internal combustion engine;
   an electrically-heated catalyst device provided in an exhaust passage of the internal combustion engine, the electrically-heated catalyst device including a conductive base material that generates heat upon being energized, and a catalyst heated through the conductive base material; and
   an electronic control unit configured to control a base material electric power supply that is supplied to the conductive base material,
   the electronic control unit being configured to determine whether or not the conductive base material is in a stagnant period where a temperature of the conductive base material partially stagnates in a prescribed temperature zone, the stagnant period occurring when water is present inside the electrically-heated catalyst device in a process of increase in temperature of the conductive base material,
   when determining that the conductive base material is in the stagnant period, the electronic control unit being configured to control the base material electric power supply to be lower than when determining that the conductive base material is not in the stagnant period, the electronic control unit being configured to calculate an internal water content that is a water content present inside the electrically-heated catalyst device, and when the internal water content is larger than zero, or equal to or more than a prescribed water content, and the temperature of the conductive base material is equal to or more than a prescribed temperature that allows determination that the water present inside the electrically-heated catalyst device is evaporated, the electronic control unit being configured to determine that the conductive base material is in the stagnant period.

2. The vehicle according to claim 1, wherein when determining that the conductive base material is in the stagnant period, the electronic control unit is configured to control the base material electric power supply to be lower than when determining that the conductive base material is not in the stagnant period, based on the internal water content, and when the internal water content is large, the electronic control unit is configured to control the base material electric power supply to be lower than when the internal water content is small.

3. The vehicle according to claim 1, wherein when determining that the conductive base material is in the stagnant period, the electronic control unit is configured to control the base material electric power supply, for a prescribed time, to be a prescribed electric power that is lower than a prescribed normal electric power supply that is supplied to the conductive base material when determining that the conductive base material is not in the stagnant period, and when the internal water content is large, the electronic control unit is configured to set the prescribed time longer than when the internal water content is small.

4. The vehicle according to claim 1, wherein the prescribed water content is a water content where a temperature difference, generated between a region where water is present and a region where water is not present in the conductive base material in a process of increase in temperature of the conductive base material when the electronic control unit controls the base material electric power supply to be the prescribed normal electric power supply, becomes equal to or more than a prescribed temperature difference, the prescribed normal electric power supply being supplied to the conductive base material when the electronic control unit determines that the conductive base material is not in the stagnant period.

5. A control method for a vehicle, the vehicle including an internal combustion engine, an electrically-heated catalyst device provided in an exhaust passage of the internal combustion engine, and an electronic control unit, the electrically-heated catalyst device including a conductive base material that generates heat upon being energized, and a catalyst heated through the conductive base material, the control method comprising:

controlling, by the electronic control unit, a base material electric power supply that is supplied to the conductive base material;

determining, by the electronic control unit, whether or not the conductive base material is in a stagnant period where a temperature of the conductive base material partially stagnates in a prescribed temperature zone, the stagnant period occurring when water is present inside the electrically-heated catalyst device in a process of increase in temperature of the conductive base material;

calculating, by the electronic control unit, an internal water content that is a water content present inside the electrically-heated catalyst device;

determining, by the electronic control unit, that the conductive base material is in the stagnant period, when the internal water content is larger than zero, or equal to or more than a prescribed water content, and the temperature of the conductive base material is equal to or more than a prescribed temperature that allows determination that the water present inside the electrically-heated catalyst device is evaporated; and controlling, by the electronic control unit, when the electronic control unit determines that the conductive base material is in the stagnant period, the base material electric power supply to be lower than when determining that the conductive base material is not in the stagnant period.

* * * * *